(12) United States Patent
Sun

(10) Patent No.: US 9,495,630 B2
(45) Date of Patent: Nov. 15, 2016

(54) ELECTRONIC TAG

(71) Applicant: HON HAI PRECISION INDUSTRY CO., LTD., New Taipei (TW)

(72) Inventor: Zong-Yuan Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/689,953

(22) Filed: Apr. 17, 2015

(65) Prior Publication Data

US 2016/0224880 A1 Aug. 4, 2016

(30) Foreign Application Priority Data

Jan. 30, 2015 (CN) .......................... 2015 1 0048963

(51) Int. Cl.
*G06K 19/06* (2006.01)
*G06K 19/077* (2006.01)

(52) U.S. Cl.
CPC ................. *G06K 19/07747* (2013.01)

(58) Field of Classification Search
CPC ............. G06K 19/07749; G06K 19/07758; G06K 19/0776; G06K 19/041; G06K 19/07718; G06K 19/07722; G06K 19/07728; G06K 19/07745; G06K 19/0775; G06K 19/07752; G06K 19/07786; G06K 19/07798; H01Q 1/526

USPC ......................... 235/492, 486, 488, 487, 375
See application file for complete search history.

(56) References Cited

U.S. PATENT DOCUMENTS

| | | | | |
|---|---|---|---|---|
| 2004/0212544 | A1* | 10/2004 | Pennaz | G06K 19/07749 343/795 |
| 2006/0273180 | A1* | 12/2006 | Ammond | G06K 19/07749 235/492 |
| 2007/0159339 | A1* | 7/2007 | Matsuura | G06K 19/07749 340/572.8 |
| 2009/0212919 | A1* | 8/2009 | Selgrath | G06K 19/041 340/10.1 |
| 2013/0299588 | A1* | 11/2013 | Lin | G06K 19/07798 235/488 |
| 2014/0335785 | A1* | 11/2014 | Kato | H01Q 7/00 455/41.1 |

* cited by examiner

*Primary Examiner* — Thien M Le
(74) *Attorney, Agent, or Firm* — Zhigang Ma

(57) ABSTRACT

An electronic tag includes a baseboard, a printed layer, a radio frequency identification (RFID) chip, and an adhesive layer. The baseboard includes a first surface and a second surface opposite to the first surface. The printed layer is disposed on the first surface of the baseboard and serves an antenna of the electronic tag. The RFID chip is secured on the baseboard. The adhesive layer is disposed on the second surface of the baseboard and is configured to detachably adhere to an object. The RFID chip and the printed layer are electronically interconnected for cooperatively receiving/transmitting wireless signals.

12 Claims, 4 Drawing Sheets

ELECTRONIC TAG

FIELD

The subject matter herein generally relates to electronic tags, and particularly to a radio frequency identification (RFID) tag.

BACKGROUND

RFID tags are used in position tracking systems to identify locations of mobile objects in real-time and are used in a wide variety of applications, including transportation, logistics management, healthcare, and security. However, the RFID tags may be attached to a metal support surface of mobile objects, thereby influencing the sensitivity of the RFID tags.

BRIEF DESCRIPTION OF THE DRAWINGS

Implementations of the present technology will now be described, by way of example only, with reference to the attached figure, wherein.

DETAILED DESCRIPTION

Figure 1:
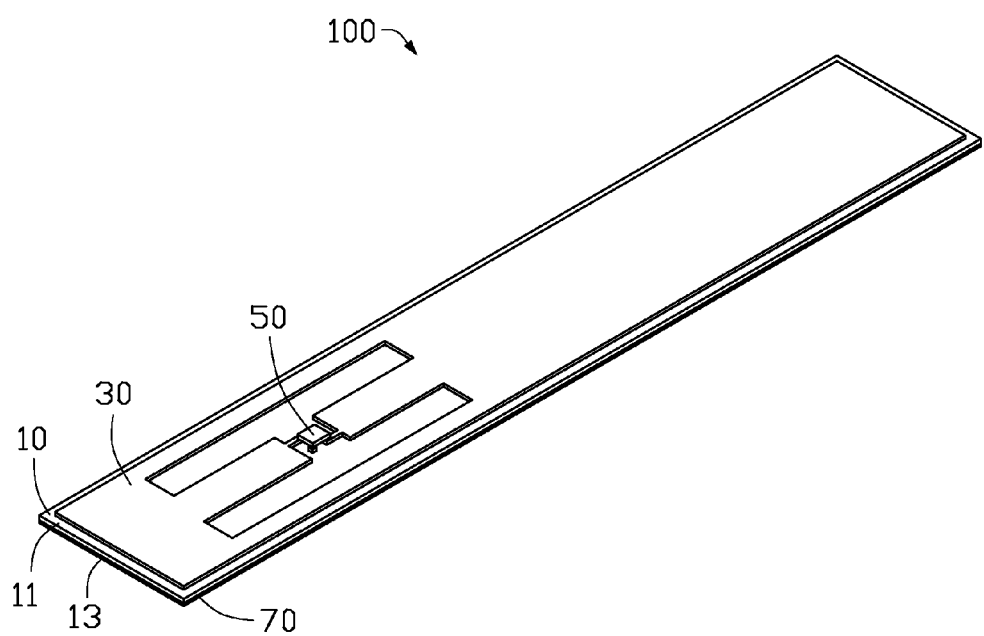
FIG. 1 is an assembled, isometric view of an electronic tag, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electronic tag.

FIG. 1 illustrates an electronic tag 100. The electronic tag 100 is a radio frequency identification (RFID) tag, and can be attached to an object (not shown) to allow the object to be tracked and verified by an RFID reader. In at least one embodiment, the object may have a metal support surface where the electronic tag 100 is attached. In other embodiments, the object may be made of other nonmetal materials, such as plastics, papers, and composites.

The electronic tag 100 includes a baseboard 10, a printed layer 30, an RFID chip 50, and an adhesive layer 70.

The baseboard 10 is substantially a rectangular shape and includes a first surface 11 and a second surface 13 opposite to the first surface 11. The printed layer 30 and RFID chip 50 are disposed on the first surface 11 and are electronically interconnected for cooperatively receiving/transmitting wireless signals. The adhesive layer 70 is disposed on the second surface 13 to allow the electronic tag 100 to be adhered to the object.

Figure 2:
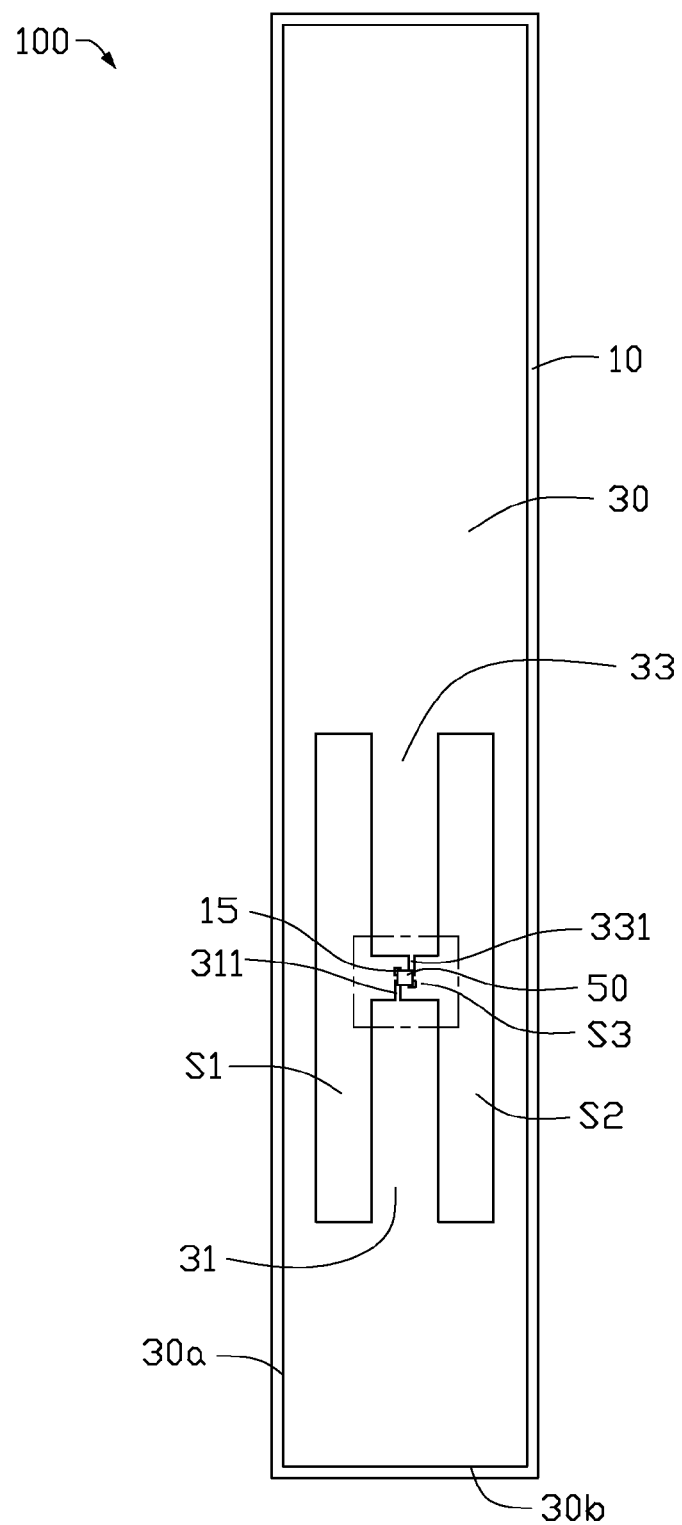
FIG. 2 is an isometric view of the electronic tag of FIG. 1.

Also referring to FIG. 2, two pads 15 are separately formed on the first surface 11 to weld the RFID chip 50. In at least one embodiment, the baseboard 10 can be made of polyethylene (PE), polyethylene terephthalate (PET), or other plastic materials.

Figure 4:
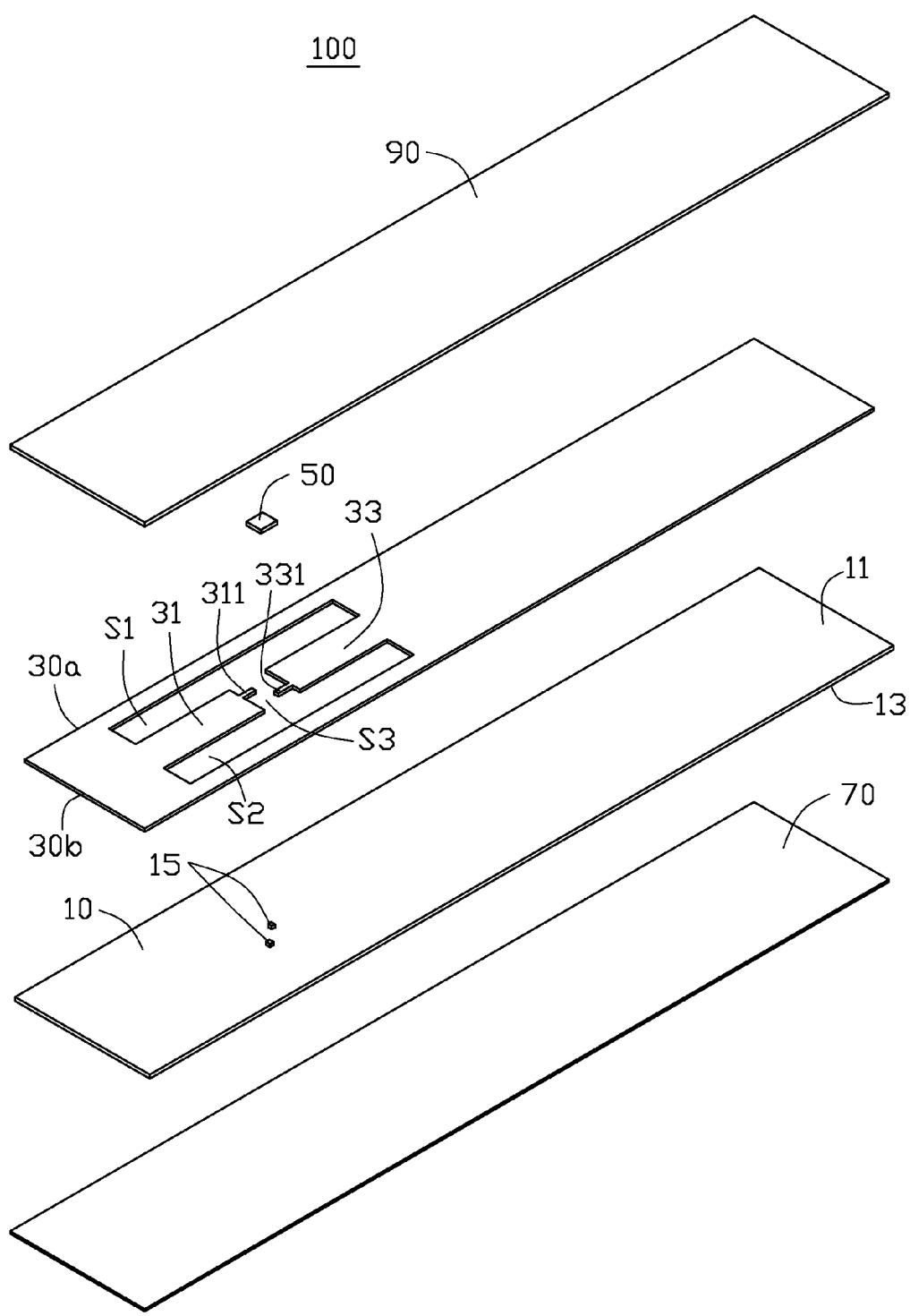
FIG. 4 is an exploded, isometric view of the electronic tag of FIG. 1.

The printed layer 30 is substantially a rectangular shape which can be formed on the first surface 11 of the baseboard 10 by etching, electroplating, or printing processes. The printed layer 30 serves an antenna of the electronic tag 100, and a size of the printed layer 30 is less than a size of the baseboard 10. FIG. 4 illustrates that the printed layer 30 includes a first edge 30a and a second edge 30b perpendicularly connected to the first edge 30a. In addition, the printed layer 30 defines a first space S1 and a second space S2. In at least one embodiment, both the first space S1 and the second space S2 are substantially rectangular-shaped slots, and are parallel to the first edge 30a.

The printed layer 30 further defines a connection hole S3 communicating with the first space S1 and the second space S2. In at least one embodiment, the connection hole S3 is disposed between the first space S1 and the second space S2 and extends parallel to the second edge 30b. Optionally, the connection hole S3 communicates with middle portions of the first space S1 and the second space S2. Thus, the first space S1, the second space S2, and the connection hole S3 cooperatively form an "H" configuration. In addition, a first connection portion 31 and a second connection portion 33 are formed between the first space S1 and the second space S2, and are also separated by the connection hole S3. The first connection portion 31 protrudes a first connection end 311, the first connection end 311 extends towards the connection hole S3 and is opposite to one of the two pads 15. The second connection portion 33 protrudes a second connection end 331, the second connection end 331 extends towards the connection hole S3 and is opposite to another one of the two pads 15. It is understood that, the connection hole S3 should be a hollow structure. In other embodiments, the first space S1 and the second space S2 can also be hollow structures.

Figure 3:
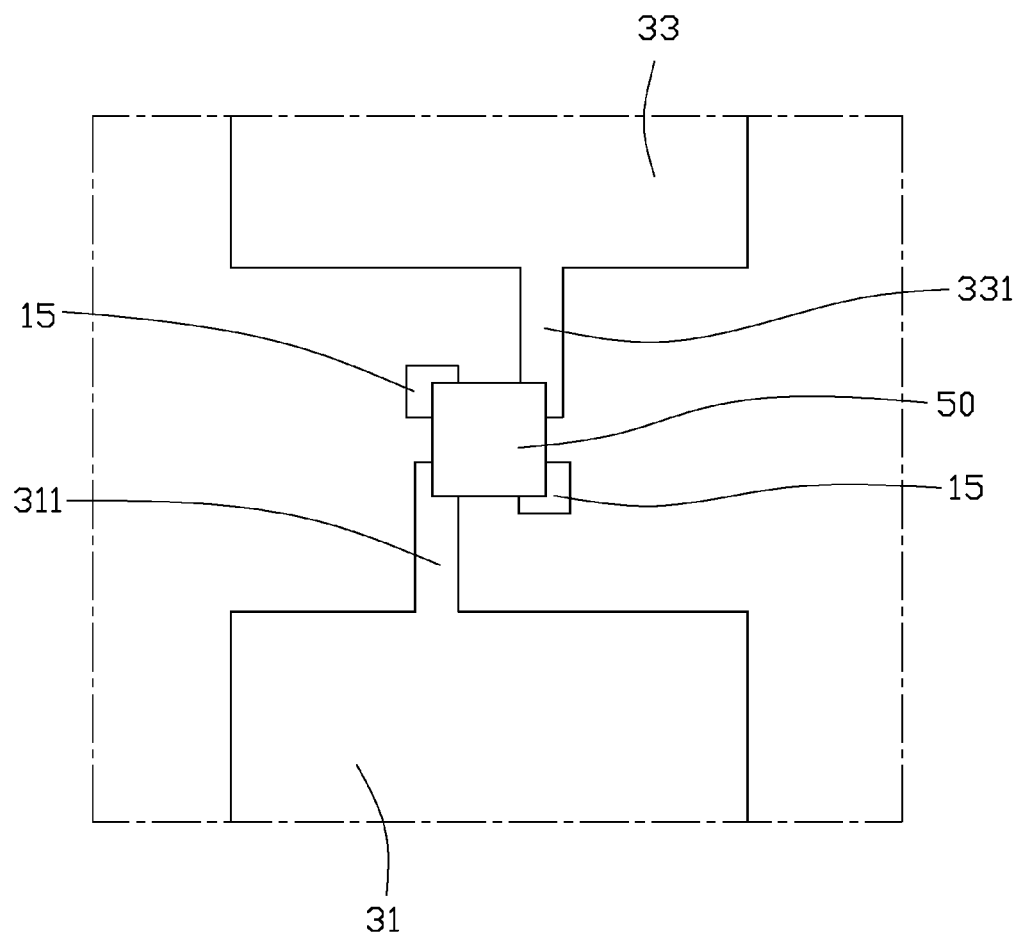
FIG. 3 is a partial, isometric view of the electronic tag of FIG. 1.

FIG. 3 illustrates that the RFID chip 50 is received in the connection hole S3. The RFID chip 50 includes two connection pins (not labeled) and two not connection (NC) pins (not labeled). The two connection pins are electronically coupled to the first connection end 311 and the second connection end 331, respectively. The two NC pins pass through the connection hole S3 and are connected to the two pads 15, respectively, to secure the RFID chip 50 to the baseboard 10.

Also referring to FIG. 4, the adhesive layer 70 can be adhered to the second surface 13 of the baseboard 10, and then is detachably adhered to the metal support surface of the object. Thus, the electronic tag 100 can be disengaged from the object, and consequently be reused.

Additionally, a marking layer 90 is incorporated into the electronic tag 200, and a mark or an identifier can be printed on the marking layer 90. The marking layer 90 is disposed on the printed layer 30 opposite to the baseboard 10 to shield the printed layer 30 and the RFID chip 50. In at least one embodiment, the marking layer 90 is made of paper or thermoplastic polyester film.

In assembly, the printed layer 30 is disposed on the first surface 11 of the baseboard 10. The RFID tag 50 is received in the connection hole S3 and is electronically coupled to the first connection end 311 and the second connection end 331 of the printed layer 30. Thus, the RFID tag 50 can receive/transmit the wireless signals via the printed layer 30. Additionally, the RFID tag 50 is welded on the baseboard 10 via the two pads 15. The adhesive layer 70 is adhered to the second surface 13 of the baseboard 10, and the marking layer 90 is disposed on the printed layer 30 opposite to the baseboard 10. Thus, when the adhesive layer 70 is adhered to the object, the object can be tracked and verified via the electronic tag 100. Further, a radiation radius can be fine tuned by changing the size of the printed layer 30, or the sizes and/or the positions of the first space S1, the second space S2, and the connection hole S3.

In summary, the printed layer 30 serves the antenna of the electronic tag 100, and the printed layer 30 and the RFID tag 50 are disposed on a first surface 11 of the baseboard 10. In addition, the adhesive layer 70 is adhered to the second surface 13 of the baseboard 10 and detachably adhered to the metal support surface of the object. Thus, a sensitivity of the electronic tag 100 influenced by the object can be significantly reduced. Additionally, the electronic tag 100 may have greater radiation radius by defining the first space S1 and the second space S2 on the printed layer 30.

The embodiments shown and described above are only examples. Many details are often found in the art such as the other features of the electronic tag. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic tag, comprising:
    a baseboard comprising a first surface and a second surface opposite to the first surface, two pads separately formed on the first surface;
    a printed layer disposed on the first surface of the baseboard and serving an antenna of the electronic tag, the printed layer defining a first space, a second space, and a connection hole communicating with the first space and the second space, a first connection portion and a second connection portion formed between the first space and the second space, the first connection portion protruding a first connection end, the second connection portion protruding a second connection end;
    a radio frequency identification (RFID) chip secured on the baseboard; and
    an adhesive layer disposed on the second surface of the baseboard and configured to detachably adhere to an object;
    wherein the RFID chip and the printed layer are electronically interconnected for cooperatively receiving/transmitting wireless signals, the RFID chip is diagonally and electronically coupled to the first connection end and the second connection end to couple to the printed layer, and is diagonally welded on the two pads to couple to the baseboard.

2. The electronic tag as claimed in claim 1, wherein the RFID chip passes through the connection hole and is connected to the two pads.

3. The electronic tag as claimed in claim 1, wherein the printed layer comprises a first edge and a second edge perpendicularly connected to the first edge, both the first space and the second space are parallel to the first edge, and the connection hole extends parallel to the second edge.

4. The electronic tag as claimed in claim 3, wherein the first connection portion and the second connection portion are also separated by the connection hole.

5. The electronic tag as claimed in claim 4, wherein the first connection end is extending towards the connection hole, and the second connection end is extending towards the connection hole.

6. The electronic tag as claimed in claim 1, further comprising a marking layer, wherein the marking layer is disposed on the printed layer opposite to the baseboard to shield the printed layer and the RFID chip.

7. An electronic tag detachably attached to an object, the electronic tag comprising:
    a baseboard comprising a first surface and a second surface opposite to the first surface, two pads separately formed on the first surface;
    a printed layer disposed on the first surface, the printed layer defining a first space, and a second space, and a connection hole communicating with the first space and the second space; and
    a radio frequency identification (RFID) chip passing through the connection hole and secured on the baseboard; and
    an adhesive layer disposed on the second surface of the baseboard and configured to detachably adhere to the object;
    wherein the printed layer forms a first connection portion and a second connection portion disposed between the first space and the second space, the first connection portion protrudes a first connection end, the second connection portion protrudes a second connection end, and the RFID chip is diagonally and electronically coupled to the first connection end and the second connection end to couple to the printed layer, and is diagonally welded on the two pads to couple to the baseboard.

8. The electronic tag as claimed in claim 7, wherein the printed layer comprises a first edge and a second edge perpendicularly connected to the first edge, both the first space and the second space are parallel to the first edge, and the connection hole extends parallel to the second edge.

9. The electronic tag as claimed in claim 7, wherein the first connection portion and the second connection portion are separated by the connection hole.

10. The electronic tag as claimed in claim 7, wherein the first connection end is extending towards the connection hole, and the second connection end is extending towards the connection hole.

11. The electronic tag as claimed in claim 7, further comprising a marking layer, wherein the marking layer is disposed on the printed layer opposite to the baseboard to shield the printed layer and the RFID chip.

12. An electronic tag comprising:
- a baseboard having a first surface and a second surface opposite the first surface, two pads separately formed on the first surface;
- a print layer positioned on the first surface of the baseboard, the printed layer defining an "H" shaped space, the printed layer defining a first space, a second space, and a connection hole communicating with the first space and the second space, a first connection portion and a second connection portion formed between the first space and the second space, the first connection portion protruding a first connection end, the second connection portion protruding a second connection end;
- a radio frequency identification (RFID) chip secured to the first surface and positioned within the defined H-shaped space of the print layer; and
- an adhesive layer positioned on a portion of the second surface;
- wherein, the printed layer is configured to act as an antenna for the RFID chip and the printed layer is electronically connected to the RFID chip to cooperatively receive and transmit wireless signals, the RFID chip is diagonally and electronically coupled to the first connection end and the second connection end to couple to the printed layer, and is diagonally welded on the two pads to couple to the baseboard; and
- wherein, the adhesive layer is configured to selectively attach the tag to an object.

\* \* \* \* \*